United States Patent
Engelmann et al.

(10) Patent No.: US 6,226,164 B1
(45) Date of Patent: May 1, 2001

(54) CIRCUIT ARRANGEMENT FOR ACTIVATING WARNING SIGNAL GENERATORS

(75) Inventors: Mario Engelmann, Steinbach; Wolfgang Fey, Niedernhausen; Olaf Zinke, Munich, all of (DE)

(73) Assignee: Continental Teves AG & Co., OHG, Frankfurt (DE)

( * ) Notice: Subject to any disclaimer, the term of this patent is extended or adjusted under 35 U.S.C. 154(b) by 0 days.

(21) Appl. No.: 09/242,033

(22) PCT Filed: Jun. 25, 1997

(86) PCT No.: PCT/EP97/03335

§ 371 Date: Jan. 21, 2000

§ 102(e) Date: Jan. 21, 2000

(87) PCT Pub. No.: WO98/06076

PCT Pub. Date: Feb. 12, 1998

(30) Foreign Application Priority Data

Aug. 5, 1996 (DE) ................................. 196 31 627

(51) Int. Cl.$^7$ .................................................. H01H 73/00
(52) U.S. Cl. ................... 361/115; 361/64; 361/81
(58) Field of Search ................... 361/115, 64, 81

(56) References Cited

U.S. PATENT DOCUMENTS 4,016,457    4/1977   Frait ........................................ 361/49

FOREIGN PATENT DOCUMENTS

| 2 046 945 | 9/1970 | (DE) | ............................... G08B/23/00 |
| 1 926 665 | 11/1970 | (DE) | ............................... G08B/23/00 |
| 2 135 606 | 1/1973 | (DE) | ............................... G08B/23/00 |
| 40 37 175 | 6/1991 | (DE) | ............................... B60T/8/88 |
| 43 10 530 | 10/1994 | (DE) | ............................... B60T/17/22 |
| WO92/17358 | 10/1992 | (WO) | ............................... B60T/8/88 |

*Primary Examiner*—Stephen W. Jackson
(74) *Attorney, Agent, or Firm*—Rader, Fishman & Grauer PLLC

(57) ABSTRACT

A circuit configuration for actuating active- and/or passive-operated warning signal generators or warning lamps (WL1, WL2) comprises an integrated circuit (IC1) having individual actuating steps (1,2) and connections for the individual warning signal generators. Moreover, an adapter connection (WLCON) is provided which upon connection to chassis configures the circuit (IC1) for the actuation of two passive warning lamps (Wlp) or other warning signal generators, permitting upon connection to an ohmic resistance (R) leading to chassis, actuation of an active (Wla) and a passive (Wlp) warning signal generator and configuring—if left open—the circuit (IC1) for actuating two active warning signal generators (Wla).

7 Claims, 2 Drawing Sheets

Table:

| Case<br>WLCON | 1<br>to ground | | 2<br>to R | | 3<br>open | |
|---|---|---|---|---|---|---|
| Warning signal actuation condition after POR signal | WL1<br>On | WL2<br>On | WL1<br>On | WL2<br>Off | WL1<br>Off | WL2<br>Off |
| Warning signal actuation condition upon voltage failure (VCC5=0) | self-con-ductance | self-con-ductance | self-con-ductance | high-ohmic | high-ohmic | high-ohmic |

CIRCUIT ARRANGEMENT FOR ACTIVATING WARNING SIGNAL GENERATORS

BACKGROUND OF THE INVENTION

The present invention is concerned with a circuit configuration for actuating active- and/or passive-operated warning signal generators which, upon failure of the supply voltage of the electronic system, will generate a warning signal.

Circuit assemblies of the afore-described type are needed, for example, in automotive vehicles furnished with electronic control systems. Control systems of this type include anti-locking control systems, traction slip control systems, driving stability control systems etc. Upon occurrence of an error, such as failure of the supply voltage of the electronic system, an alarm lamp is actuated or a different warning signal released. As malfunctions of this type are likely to involve danger, the circuit arrangements should be so configured as to insure flashing of a warning lamp also in case of a defective condition of the monitoring system itself or of the actuation system of the warning lamp.

DE 43 10 530 A1 already teaches a circuit configuration for actuating a warning lamp, comprising a self-conductive transistor circuit which, in the event of a failure of supply voltage in the electronic system insures a power flow to chassis from the supply source of the warning lamp across the said warning lamp and across the self-conductive transistor circuit. However, flashing of the warning lamp in the event of such a failure requires a "passive" operation of the warning lamp, i.e. a conduction of the warning lamp flow across the actuating connection and across the final phase of the warning lamp actuation. However, also "active"-operated warning lamps are known in the art that will flash even in the absence of an actuating signal. Consequently, the output of the warning signal actuating phase must become high-resistive in the event of a failure of the actuating electronic system; a self-conducting transistor circuit would, in that case, prevent the (active-operated) warning lamp from flashing.

It is, therefore, the object of the present invention to provide a circuit configuration for actuating warning lamps and other alarm signal generators to which can be connected both active and passive (i.e. active- and passive-operated) warning signal generators, nevertheless insuring, upon failure of the electronic system, in particular, of the supply voltage, flashing of the warning lamp will or releasing of a warning signal.

SUMMARY OF THE INVENTION

It has been found that this problem can be solved by a circuit configuration of the type as described in claim 1; the special feature thereof resides in that it comprises a circuit having individual steps of actuation and connections for the individual warning signal generators as well as an adapter connection (adapter pin) which upon connection to chassis configures the circuit for actuating two passive-operated warning signal generators, and which upon connection to an ohmic resistance leading to chassis permits actuation of one active- and one passive-operated warning signal generator; once the connecting pin remains open, the circuit is able to actuate two active-operated warning signal generators.

The circuit configuration of the invention, hence, is suitable for selectively connecting two active-operated and of two passive-operated generators or of one active- and one passive-operated warning signal generator. An adaptation to the mode of operation of the connected warning lamps or warning signal generators can be performed in an extremely simply way via a single connecting pin only required to be short-circuited to chassis, connected to chassis via a resistor or kept open.

According to an advantageous form of embodiment of the invention an activating control step active upon actuation is associated to each actuating step of the warning signal generator, with the functions of the said activating control step being also dependent on wiring of the adapter pin and insuring upon activation of the actuating circuit that the warning signal generators remain actuated or activated until after a check of the system; hence, the warning lamp, in the start-up phase, will flash or release an alarm signal.

The activating control steps effective only in the start-up phase and largely corresponding to the actuating steps of the warning signal generator, hence, are also adapted—in an active or passive way—by wiring the adapter pin to the mode of operation of the warning signal generator as connected.

Feasibly, the actuating steps of the warning signal generator are designed as self-conductive transistor circuits permitting, upon failure of the supply voltage, a power flow provided by the power supply of the warning signal generator to flow across the warning signal generator and across the actuating step, and causing the warning lamp to flash or the warning signal generator to be activated. Upon connection of the adapter pin to the resistance leading to chassis, the self-conductance of one of the two actuating steps is rendered inoperative. With an open adapter pin the self-conductance of both steps is set off.

It is feasible in respect of the case occurring particularly often in practice, to provide the simplest configuration, namely leaving the adapter pin open. The modern automotive industry mostly works with active-operated warning lamps.

The rest of the dependent claims describe additional, particularly advantageous forms of embodiment of the invention.

Further features, advantages and fields of end-use application of the invention will become manifest from the following description of details thereof with reference to the accompanying drawings, wherein

DETAILED DESCRIPTION OF THE DRAWINGS

Figure 1:
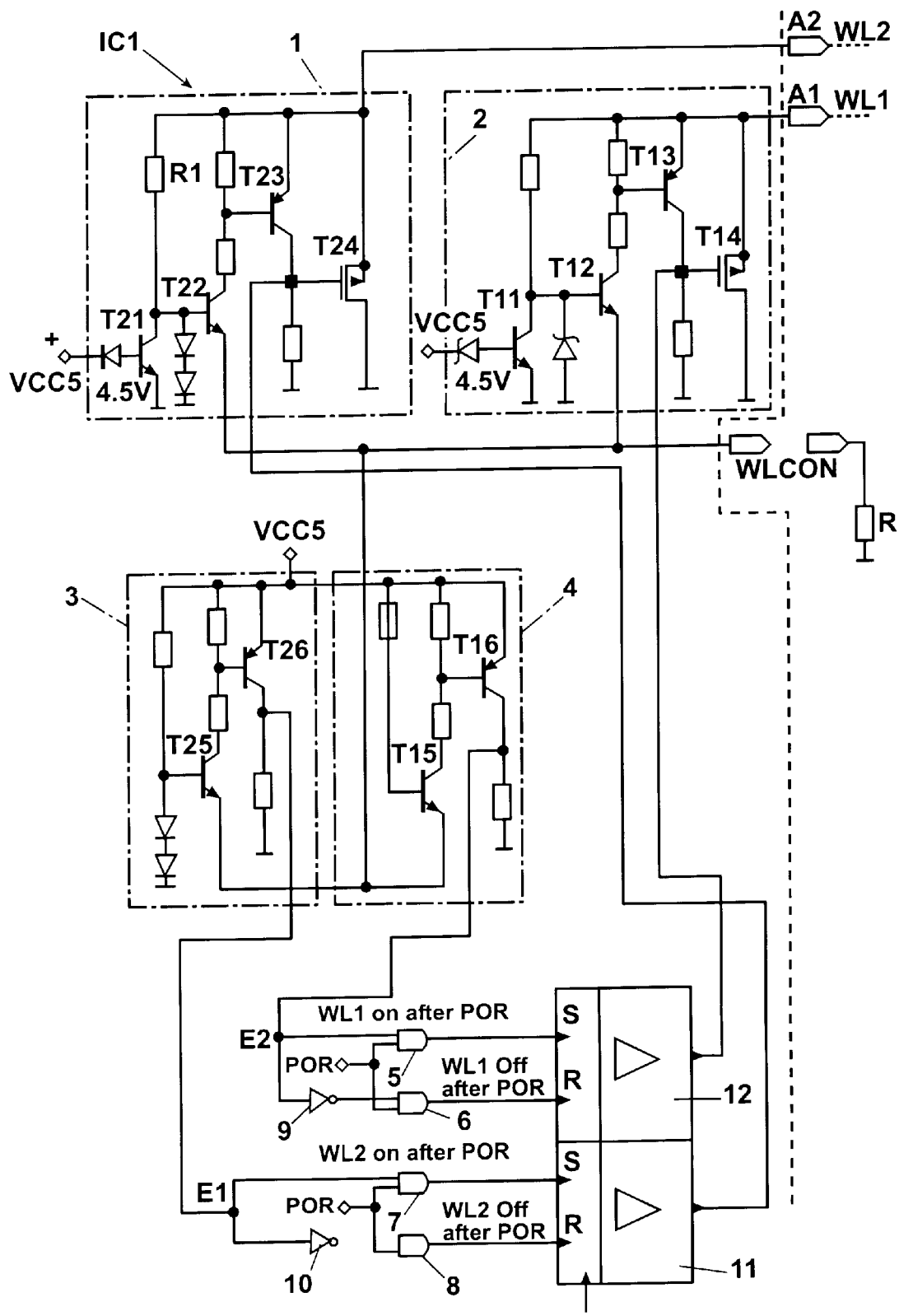
FIG. 1 shows the essential elements of the circuit configuration of the invention.

One example of embodiment of the circuit configuration of the invention is shown in FIG. 1. The broken, vertical line separates connections A1 (WL2), A2 (WL1) and WLCON or the outer connections from the electronic units shown to the left in FIG. 1 which, in the example of embodiment as presently described, are component parts of an integrated circuit IC1. The connections to the supply voltage of the electronic system are designated by reference characters VCC5; these are connections to a stabilized 5V direct voltage source (+5 Volt).

Shown in a dash-dotted frame in FIG. 1 are two actuating steps 1,2 the outputs of which lead to connections A2 (WL2)

and A1 (WL1) for respectively one warning lamp or another warning signal generator. The adaptation of these two actuating steps 1,2 to the mode of operation of the respectively connected warning lamp WL1 or WL2, in the practice of the invention, is through wiring the connection WLCON either left open or directly connected to chassis or to an ohmic resistance R leading to chassis.

Two other control steps, i.e. the activating control steps 3 and 4 of circuit IC1, are also adapted—in an active or passive way—to the mode of operation of the connected warning lamps by wiring the adapter pin or adapter connection WLCON.

In the present example of embodiment, the circuit IC1 is a component part of a so-called "Power Control IC" (PCIC) for a hydraulic, electronically controlled anti-locking control system (ABS). The whole of the circuit PCIC (not shown) contains 10 valve drivers and the two warning lamp drivers or actuating steps 1,2 shown in FIG. 1. Either two active (active-operated) warning lamps or two passive (passive-operated) warning lamps or one active- and one passive-operated warning lamp are to be connected via connections A1 (WL1) and A2 (WL2).

Figures 2, 3:
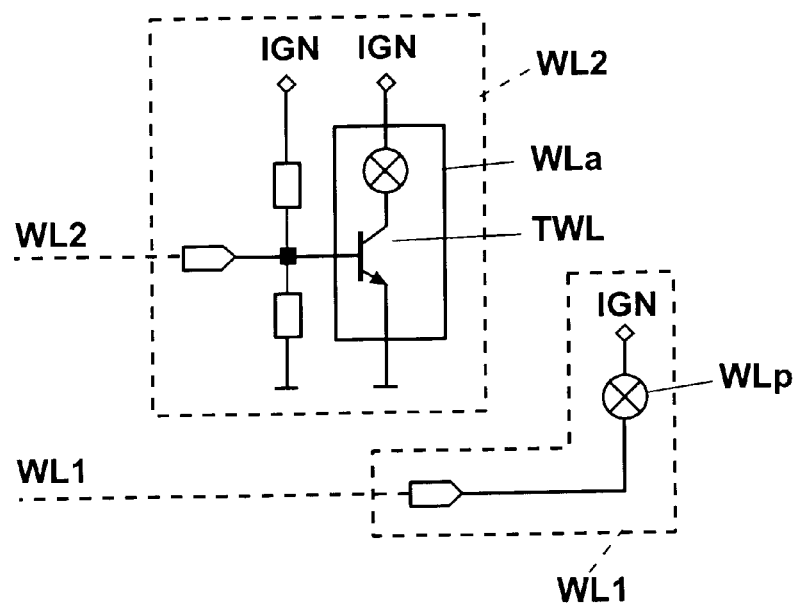
FIG. 2 schematically shows the basic design of an active- and a passive-operated warning lamp.
FIG. 3 presents in tabulated form the states of the warning lamp drivers in different configurations and circuit conditions.

FIG. 2 shows the differences between the active and the passive (i. e. active-operated and passive-operated) warning lamps. Connected to A1/WL1 in that example, is a passive warning lamp WLp, i.e. a conventional bulb which will flash once the lamp driver (or the final stage T14 in FIG. 1) is connected to chassis. After activation of the voltage supply of the controller (e.g. an anti-locking control) of which FIG. 1 only shows IC1, the lamp is first to flash; the lamp driver—or stated more correctly—the final phase T14 of the actuating step 2, must be switched to passage. Upon failure of the supply voltage on the controller, the output driver T14 insures by "self-conductance" that the passive warning lamp WL1 (WLp) will flash once the engine ignition (IGN) is activated. "IGN", in the present instance, is connected—as it usually is—to the plus pole of the vehicle battery. Consequently, the battery voltage causes a current flow through the (passive) warning lamp WL1 (WLp) across transistor T14 of the self-conductive driver step. Hence, flashing of the (passive) warning lamp WL1 is indicative of a failure of the supply voltage VCC5.

In the example as shown, an active-operated warning lamp Wla comprising a bulb and a driver transistor TWL and preferably being arranged in the instrument panel of the automotive vehicle is connected, through connection A2/WL2, to the second lamp driver. The driver transistor TWL is controlled through the actuating step 1 within the circuit IC1. The bulb of the active warning lamp WLa will flash once the connection to the integrated circuit IC1 is discontinued. To deactivate the active warning lamp, the final stage T24 (FIG. 1) of the control step 1 is switched to passage and the control or output conduit WL2 is connected to chassis. With a high-resistive T24, the active warning lamp WL2 (W1a) is on.

Reverting to FIG. 1, the actuating steps 1,2 and the activating steps 3,4 are of a very similar structure. In lieu of the driver transistors T24, T 14 connected in the actuating steps 1 and 2, a flip-flop or a warning lamp register 11,12 is connected in the activating control steps 3,4.

Of relevance to the invention is the configuration capability of the warning lamp actuation or of the circuit IC1 as shown in FIG. 1, with the aid of a single adapter connection or adapter pin WLCON. By correspondingly wiring the said adapter pin, it will be possible to connect (1) two passive warning lamps (or similar passive warning signal generators), (2) one passive and one active warning lamp (or warning signal generator) or (3) two active warning lamps.

For the purposes of adaptation to case (1), the adapter pin WLCON is short-circuited, i.e. connected to chassis. Both driver transistors T24, T14 will in that case become self-conductive upon failure of the supply voltage VCC5. After starting the ignition (IGN), transistor T22 is actuated via the basic resistance RI of the actuating step 1, thereby also activating transistors T23. The same applies, mutatis mutandis, to actuating step 2.

In the activating control step 3, (case 1), the transistor T26 will also become conductive so that the positive potential of the source VCC5—reduced by the voltage drop via T26—will also reach input E1 of the gate at the input of the flip-flop or register 11. The same applies, mutatis mutandis, to the potentials in the activating control phase 4, to T16 and, last but not least, to the potential at the input E2. Consequently, positive potential is on the gate connections of the output driver transistors T24, T14 so that the said driver steps become selfconductive.

If, as opposed thereto (case 2), an active or passive warning lamp is to be activated, it will be necessary to connect the adapter pin WLCON, via ohmic resistance R, to chassis. The voltage drop on the said adapting resistance R does not change the afore-described activating condition of the transistors in actuating step 2. Conversely, the voltage drop on the said adapting resistance R connected as an "emitter resistance" of transistor T22 of the actuating step 1, will cause transistors T22 and T25 of actuating step 1, and transistors T25, T26 of the actuating control step 3 to be blocked. For, with the aid of two series-connected diodes, the basic potential of transistor T22 and T25, respectively, is fixed to a relatively low level determined by the passage voltage of the diodes (see FIG. 1) while the emitter potential of transistors T22, T25 is raised by the emitter resistance R. The driver transistor T24 of the actuating step 1 thereby loses its self-conductance so that the active warning lamp connected to connection A2 will flash in the event of a failure of the supply voltage VCC5 of the electronic system, which does no apply to the driver transistor T14 for which reason connection A1 continues to be able to connect a passive-operated warning lamp WLp (see FIG. 2). The input E1 on the gate of the flip-flop 11 in that case is connected to chassis potential because T26 is also blocked.

Finally, there are vehicle types in which an active warning lamp is to be connected to both connections A1 and A2. In that case (3), the adapter pin WLCON remains open. In the event of a failure of the supply voltage VCC5, no power flow can take place across transistors T22, T12, T25 and T15 of steps 1 through 4. Consequently, the transistors are blocked; the selfconductivity of the actuating steps 1,2 will not be activated. In the event of a failure of the supply voltage VCC5 of the electronic system, the active warning lamps will flash.

The activating control steps 3,4 the function of which has been described in detail in the afore-going, will only be needed during activation of the voltage supply to the electronic system and of the entire power control IC. Wiring of the adapter pin WLCON, basically, has the same effect on the actuating steps 1,3 and on the activating control steps 3,4.

The activating steps 3,4 in conjunction with the flip-flop 11,12 insure that the active and/or passive warning lamps connected to the "pins" A1, A2, initially flash in the activating phase. Once the voltage level of the voltage supply VCC5 has reached a predetermined value, the POR signal (Power on Reset Signal) is generated, thereby providing, via the AND gates 5,6,7,8 and the series-connected inverters 9,10 a set or reset signal at the input of the flip-flop 11,12 which, in the desired way, blocks or switches to passage the final phase transistors T24, T14, depending on the wiring of the adapter pin WLCON.

The function of the activating steps 3,4 corresponds to the function of the actuating steps 1,2 except that supply to the activating steps 3,4 is from the supply voltage VCC5 of the electronic system and not from the vehicle battery via connections IGN, lamp and WL1/A1, WL2/A2. The transistors T26, T16 of the activating control steps 3,4 will determine the potential on the inputs E1, E2 of the logic gates on the input of the flip-flop 11,12.

The POR signal is in the form of a pulse signal generated only once when the electronic system is activated. The POR signal, via the AND gates 5 through 8, is logically combined with the signal generated by transistors T26, T16, or with the inverted signal provided by the inverter steps 9,10.

FIG. 3 shows the conditions of the warning lamp drivers (especially of the final-stage transistors T24, T14) in response to the configuration or the wiring of the adapter connection WLCON. The bottommost "voltage failure" line conveys the conditions providing for "self-conductance". In these cases, the connection WL1/WL2 is suitable for a passive-operated and otherwise for an active-operated warning lamp.

What is claimed is:

1. A circuit configuration for actuating a plurality of warning signal generators generating upon failure of the supply voltage of an electronic system an alarm signal, comprising:

an integrated circuit having individual actuating steps and connections for the individual warning signal generators;

an adapter connection which, when connected to chassis, configures the circuit for the actuation of two passive-operated warning signal generators and, when connected to an ohmic resistance leading to chassis, configures a warning signal generator connection for actuating an active-operated warning signal generator; and a warning signal generator connection for connection of a passive-operated warning signal generator which—once the adapter connection remains open configures the circuit for actuation of two active-operated warning signal generators.

2. A circuit configuration according to claim 1, wherein associated to each actuating step of the warning signal generator is an activating control step which is active during activation of the circuit, with the functions of the said control step being also dependent on the wiring of the adapter connection, and said control step safeguarding during activation of the circuit that the warning signal generators are actuated or remain activated until the system has been checked and the supply voltage of the electronic system has been raised.

3. A circuit configuration according to claim 2, wherein, during activation of the actuation circuit of the warning signal generator, a set or reset command is generated, and that the activating control steps of the circuit, upon occurrence of a set or reset command by actuation of final stages of the actuating steps of the warning signal generator insure activation of the warning signal generator during the activating phase.

4. A circuit configuration according to claim 1, wherein the actuating step connected to which is a passive-operated warning signal generator, as a result of wiring the adapter connection, is designed in the form of a self-conductive transistor circuit which, upon failure of the supply voltage of the electronic system, permits a flow of current which is provided by the power supply of the warning signal generator and which is flowing through the warning signal generator and through the appertaining actuating step.

5. A circuit configuration according to claim 4, wherein both actuating steps upon connection of the adapter connection to chassis, are self-conducting transistor circuits which upon failure of the supply voltage of the electronic system permit a flow of current provided by the power supply of the warning signal generators and flowing across the warning signal generators and across the actuating step.

6. A circuit configuration according to claim 1, wherein, upon connection of the adapter connection to resistance leading to chassis, one control step will become self-conductive while the self-conductance of the other actuating step will be inactivated by the rise in potential as a result of resistance.

7. A circuit configuration according to claim 1, wherein the warning signal generators are warning lamps.

* * * * *